March 10, 1970     P. A. DARRAH     3,499,225
MAGNETICALLY ATTACHED IRONWORKER TOOL
Original Filed Dec. 14, 1967
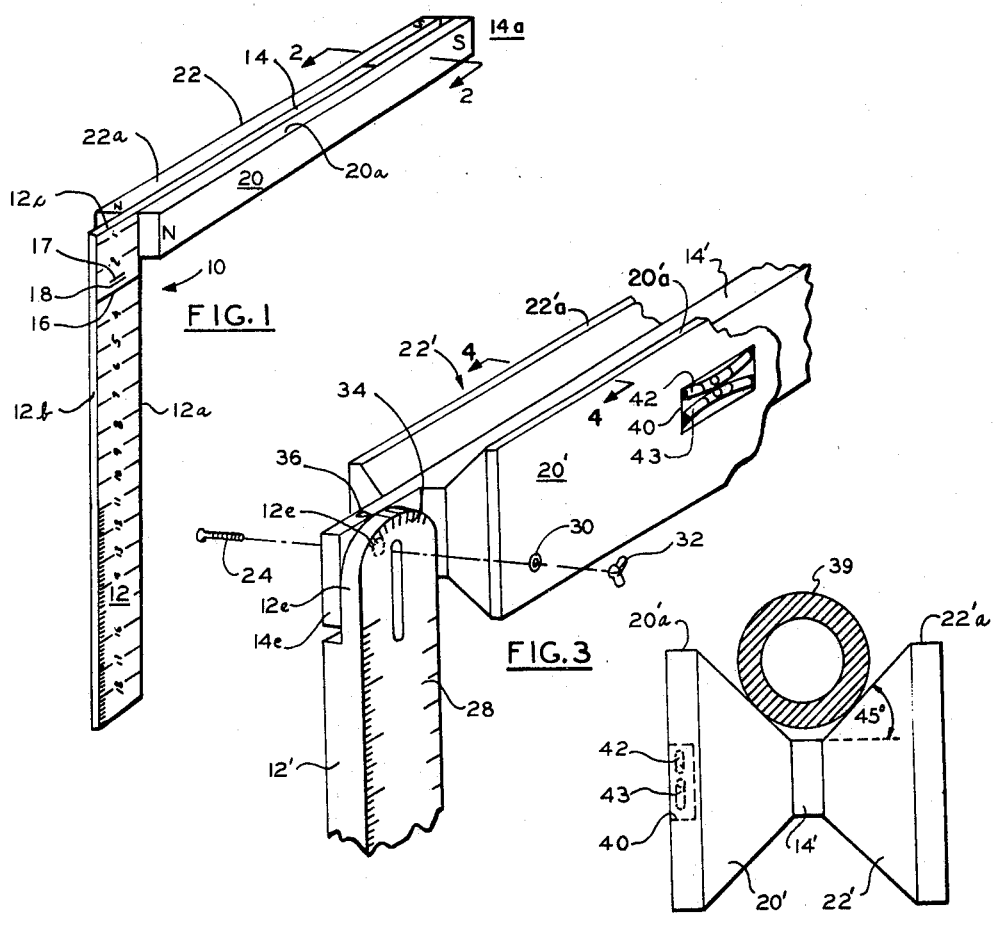
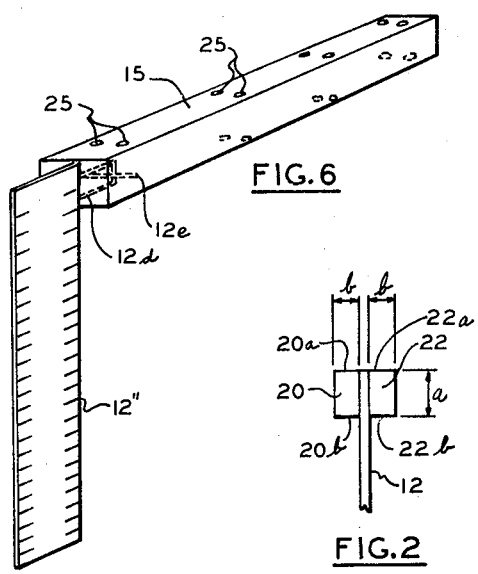
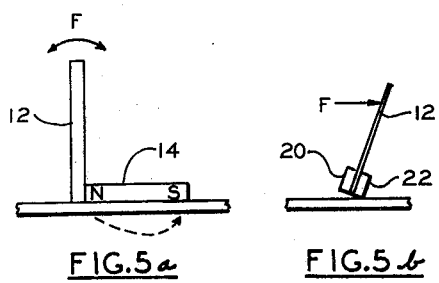
INVENTOR.
PERCY A. DARRAH
BY *Richard G. Stephens*
ATTORNEY

United States Patent Office 3,499,225
Patented Mar. 10, 1970

3,499,225
MAGNETICALLY ATTACHED
IRONWORKER TOOL
Percy A. Darrah, R.D. 1, Conklin, N.Y. 13748
Continuation of application Ser. No. 690,493, Dec. 14, 1967. This application Mar. 10, 1969, Ser. No. 805,901
Int. Cl. G01c 9/00
U.S. Cl. 33—89
11 Claims

ABSTRACT OF THE DISCLOSURE

An ironworker's tool comprising a non-magnetic square having magnet means located along one leg with scale indicia inscribed on the other leg.

This application is a continuation of application Ser. No. 690,493, filed Dec. 14, 1967 and now abandoned.

My invention relates to an improved square for use by steel fabricators and erectors, and more particularly, to an improved square embodying magnetic attachment means which is capable of holding the square in place on steel beams and girders and the like. A variety of operations performed in steel fabricating shops, such as drilling and welding, for example, require that two or more work pieces be accurately aligned relative to each other, and many such operations have required two persons, with one person serving only to hold a square or level or the like adjacent the workpieces to determine the correctness of their alignment. When certain shapes and sizes of workpieces have been aligned it sometimes has been difficult for a workman to hold a square fixedly in place without it jiggling, and errors in drilling or welding which have occurred from failure to precisely align pairs of workpieces often are extremely difficult and expensive to correct. The invention, comprising a square which magnetically attaches itself and holds itself fixedly on one of the workpieces, allows one workman to perform many operations which formerly required two workmen, and furthermore, eliminates errors which have arisen due to manual jiggling of a square. In many steel erection operations in the field the invention provides even greater advantages. An ironworker on a tall building or bridge or like structure often encounters situations where he must use one of his hands to hold onto the structure and thus has only one hand free to perform work. If he must use his one free hand to hold a square in place, while directing a crane operator, for example, so as to relatively align two large workpieces, he is unable to insert bolts or perform other operations without removing the square from the workpieces and laying it down. Often he finds no convenient place in which he can lay down the square, and even if he does, it will be appreciated that movement of the workpieces while he lays down the square and until he inserts a bolt or makes a weld can cause a serious error. Also, unless a square is carefully laid in place when not in use, it may fall, not only causing a great delay until it is retrieved, but also creating a hazard to workmen below. The invention obviates such problems by providing a square which not only holds itself in place during alignment of the workpieces, but which attaches itself to any convenient steel surface, so that it need not be carefully handled and will not fall from the ironwork structure. Thus it is a primary objective of the present invention to provide an improved tool for use in steel fabrication and erection which will attach itself securely to structural iron and steel yet be readily removable.

Other objects of the invention will in part be obvious and will in part appear hereinafter.

The invention accordingly comprises the features of construction, combinations of elements, and arrangements of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is an isometric view of a simple basic form of the invention.

FIG. 2 is a cross-section view taken at lines 2—2 in FIG. 1.

FIG. 3 is an isometric view of a portion of an alternative form of the invention illustrating several additional features which optionally may be incorporated into the basic device of FIG. 1.

FIG. 4 is a cross-section view taken at lines 4—4 in FIG. 3, with a workpiece shown added.

FIGS. 5a and 5b are diagrammatic views useful in describing the operation of the invention.

FIG. 6 is an alternate form of the invention using a molded plastic leg having magnetic inserts embedded therein.

The basic form of the invention illustrated in FIGS. 1 and 2 is shown as comprising an L-shaped non-magnetic piece 10 having leg portions 12 and 14. Non-magnetic piece 10 preferably is formed from aluminum and in typical applications may have a thickness of approximately $3/16$ inch, where leg 12 has a length of approximately 18 inches and leg 14 has a length of approximately 12 inches. Arm 12 carries suitable scales inscribed on both of its sides, along both inner edge 12a and outer edge 12b, with the indices of the scales referenced to upper edge 12c. For domestic use the scales preferably are calibrated in sixteenths of an inch, and it will be apparent that metric units may be utilized on devices intended for foreign use. In addition to ordinary scales, arm 12 preferably carries a special index line 16 located three inches from edge 12c and two additional index lines 17 and 18 located respectively at distances of $13/16$ inch and $15/16$ inch upward from line 16. Such special lines are very useful for conventional structural steel work for indicating the standard distance from the edges of workpieces at which rivet or bolt holes are ordinarily drilled, and for indicating the edge locations of several standard-size rivet or bolt holes.

Extending along leg 14 to its outer end 14a, preferably all the way from edge 12a, and fixedly attached to leg 14 on opposite sides of leg 14 are bar magnet pieces 20 and 22. Bar magnets 20 and 22 comprise a high-retentivity magnetic material and may comprise any one of a number of durable high retentivity alloys, and they may be permanently attached to leg 14 by non-magnetic (e.g. copper or aluminum) rivets or bolts (not shown) which pass through pieces 20, 22 and leg 14 and are countersunk on both sides, or alternatively magnets 20 and 22 may be bonded to leg 14 by welding or by use of a high-strength adhesive, a number of suitable epoxy adhesives being available. In FIGS. 1 and 2 the height (dimension $a$ in FIG. 2) of magnetic pieces 20 and 22 is shown corresponding exactly to the height of leg 14. In practice the height of magnets 20 and 22 may be greater than the height of leg 14, so that the upper faces 20a and 22a extend upwardly beyond edge 12c, and similarly, the lower faces 20b and 22b (FIG. 2) may extend below the lower edge of arm 14, if desired, for reasons to be mentioned below in connection with FIGS. 3 and 4. Edge 12c should not project upwardly beyond the upper faces of magnets 20 and 22, however. In a typical embodiment utilizing the previously-mentioned dimensions, the height (dimension $a$) and thickness (dimension $b$ in FIG. 2) of each of the bar magnets may be $1\frac{1}{2}$ inches and $3/8$ inches, respectively. In order that both inside edges and outside edges of the device be enabled to lie flush against various workpieces, it is important that edges 12a and 12b of leg 12, faces 20a, 22a, 20b and 22b constitute the inner and outer edges of the four working edges of the device, without other portions of the device protruding therebeyond.

Bar magnets 20 and 22 may be pre-magnetized and then attached to leg 14, but preferably are magnetized after being attached, by insertion of leg 14 and the magnet bars into a strong magnetic field. A suitable magnetic field to magnetize the assembly may be provided by insertion of leg 14 and the magnets axially into a simple helical coil or solenoid. While the force with which the device will adhere to any given workpiece will vary with the size, shape, permeability and surface condition of the workpiece, it is desirable that the bar magnets be magnetized sufficiently that they be capable of supporting as much as at least two or three times the weight of the assembled device when laid against typical workpieces having typical coatings of red lead or scale, etc. A typical embodiment having the dimensions mentioned above should have a cohesive force of perhaps 20 pounds, for example, when laid flat against and along a large ¼ inch steel sheet. In any event, like poles of the two magnets are arranged facing each other through non-magnetic leg 14, as indicated by the "north" (N) and "south" (S) marks in FIG. 1, thereby providing an assembly having one magnetic polarity adjacent the intersection of legs 12 and 14 and an opposite magnetic polarity at the outer end of leg 14. When the assembled and magnetized device is placed against any flat steel or iron body, which may comprise a beam, plate or other structural shape, it will be seen that the principal or resultant flux direction will be parallel to leg 14, in the manner indicated diagrammatically in FIG. 5a. The upper faces 20a and 22a of bar magnets 20 and 22 are situated in a first common plane, and lower faces 20b and 22b are also situated in a second common plane, and both planes are perpendicular to leg 12. When the device is placed on a flat plate with leg 12 perpendicular to the surface of the plate, it will be seen that both magnets 20 and 22 will attract the plate with substantially equal force. If the device is tilted, however, in the manner illustrated in FIG. 5b, it will be seen that the reluctance of the magnetic path for one bar magnet (20 in FIG. 5b) will be greatly increased as it is lifted from the workpiece, and that the reluctance of the magnetic path of the other magnet (22 in FIG. 5b) will be considerably increased with only a corner of the magnet bearing on the workpiece. Thus the opeartor is enabled to free the device from the workpiece very easily, merely by applying a force near the end of arm 12, as indicated at F in FIG. 5b. The ability to greatly decrease the cohesive force by simple tilting of the device, with the lever advantage of the length of arm 12, is highly desirable. It allows the operator to easily slide the assembly tilted at an angle along a workpiece to a desired position with only a small cohesive force existing between the assembly and the workpiece, and then to "fix" the device in the desired position merely by tilting it to allow both magnets to engage the workpiece. Some measurements, of course, require the square to be placed in locations where sidewise tilting of the type shown in FIG. 5b is precluded by the presence of other structure, and in such cases the square may be detached from the workpiece by rotation of the square in one or the other of the directions indicated by arrow F in FIG. 5a.

In the modified form of the invention illustrated in FIG. 3, the scale-carrying leg 12' and the magnet-carrying leg 14' are not permanently arranged at a 90-degree angle, but instead comprise two separate pieces which are made angularly adjustable. Bolt 24 passes through hole 26 in end 14e of leg 14', through slot 28 in end 12e of leg 12', washer 30, and is tightened and loosened by means shown as comprising wing nut 32. A scale 34 indicating various angles against index mark 36 are provided on ends 12e and 14e to facilitate adjustment of the device to a desired angle. In the device of FIG. 3, bar magnets 20' and 22' are shown provided with trapezoidal cross-sections in lieu of the rectangular shapes of FIGS 1 and 2, so that the upper faces 20'a and 22'a of the magnets are situated sugstantially above the upper face of non-magnetic leg 14', and each bar magnet varies in height from a maximum outer height to a minimum inner height adjacent leg 14', at a 45-degree angle, for example, as shown in FIG. 4. When the device of FIG. 3 is positioned adjacent a cylindrically-shaped device, such as a bar or pipe 39, it will be seen that surfaces 20'd and 22'd of the magnet will be tangent to the cylindrical device, and automatically align the square parallel to the axis of the cylindrical device. In the device of FIG. 4 recess 40 milled in the outer face of bar magnet 20' carried a pair of liquid-carrying curved glass tubes 42, 43 to provide a spirit level, with the two tubes curving in opposite directions as shown, so that the bubbles in the two tubes indicate level conditions for both upright and inverted conditions of the device.

FIG. 6 illustrates an alternative form of the invention in which the magnetic leg of the device comprises a molded non-magnetic piece 15 carrying a plurality of very high retentivity magnets 25, 25 (such as Alnico magnets) which are embedded in the molded plastic piece with their outer faces flush with those of the piece 15. Leg 12" comprises a rigid non-magnetic piece having an irregular shape (shown as comprising a tab portion 12d and cross-rod 12e) which entend into and are anchored in molded plastic piece 15, thereby rigidly anchoring arm 15 to arm 12". While magnets 25, 25 are shown circular in shape in FIG. 6, it will be appreciated that other shpes, such as rectangular ones, may be employed without departing from the invention. Magnets 25 may be molded in place, in which case they desirably may include irregular rear portions (not shown) which tend to anchor them in plastic piece 15, or alternatively they may be secured to piece 15 by means of a suitable adhesive.

It will thus been seen that the objects set forth above, among those made apparent from the preceeding description, are efficiently attained, and since certain changes may be made in the above constructions without departing from the scope of the invention, it is intended that all matter contained in the above description or shown in the accompanying drawing shall be interpreted as illustrative and not in a limiting sense.

The embodiment of the invention in which an exclusive property or privilege is claimed is defined as follows.
What is claimed is:

1. An alignment and measuring device for use by structural steel fabricators and erectors, comprising, in combination: a non-magnetic first piece having first and second leg portions extending in first and second directions, respectively, and joined together at one end of each of said portions, said first leg portion comprising a flat plate having first and second mutually parallel edges and a plurality of scale indicia inscribed on a side of said plate adjacent both said edges; said second leg portion having a pair of mutually parallel edges and permanently-magnetized magnet means attached on opposite sides of said second leg portion and extending along both edges of said second leg portion, whereby one of said edges of said second leg portion will seat against and magnetically attach said device to a magnetic workpiece having an outside corner and the other of said edges of said second leg portion will seat against and magnetically attach said device to a magnetic workpiece having an inside corner.

2. A device according to claim 1 in which said magnet means comprises first and second bar magnets situated on said opposite sides of said second leg portion and in which like poles of said pair of bar magnets are situated facing each other through said second leg portion of said non-magnetic first piece.

3. A device according to claim 1 in which said magnet means comprises first and second bar magnets situated on opposite sides of said second leg portion, each of said bar magnets having at least one flat surface portion, and in which said flat surface portions of said bar magnets are coplanar.

4. A device according to claim 1 in which said first and second directions are mutually perpendicular and in which one end of said magnet means is situated adjacent one of said edges of said first leg portion.

5. A device according to claim 1 in which said magnet means comprises first and second bar magnets situated on opposite sides of said second leg portion, each of said bar magnets having outer and inner flat surface portions, the inner flat surface portions of said pair of bar magnet means lying adjacent to said second leg portion, and in which said first leg portion includes a first and second surfaces lying between and recessed from the planes of said outer flat surface portions of said pair of bar magnets.

6. A device according to claim 1 in which said magnetic means includes a recess; and spirit level means situated within said recess.

7. A device according to claim 1 in which said first and second leg portions both have the same thickness.

8. A device according to claim 1 in which said magnet means comprises first and second bar magnets situated on opposite sides of said second leg portion, each of said bar magnets having upper and lower flat surface portions, in which said upper surface portions of said pair of bar magnet means lie in a first plane and in which said lower surface portions lie in a second plane parallel to said first plane, and in which said second leg portion includes first and second edges lying between and recessed from said first and second planes.

9. A device according to claim 1 in which said second leg portion has a length extending in said second direction and a width extending in a third direction coplanar with said first and second directions and perpendicular to said second direction, and in which said magnet means extend across said width of said second leg portion.

10. A device according to claim 5 in which each of said bar magnet means includes a surface which extends in said second direction and in a further direction non-perpendicular and non-parallel to said first direction.

11. A device according to claim 9 in which said first and second leg portions comprise separate non-magnetic pieces and in which said device includes locking means for adjustably locking said ends of said portions together to establish a desired angle between said first and second directions, said locking means comprising a bolt means extending through said ends and a nut engaging said bolt means, said bolt means and said nut means being located between and not extending outside the space between said outer flat surface portions.

References Cited

UNITED STATES PATENTS

| | | | |
|---|---|---|---|
| 351,820 | 11/1886 | Ward | 33—112 |
| 407,285 | 7/1889 | Ensminger | 33—89 |
| 524,417 | 8/1894 | Fahey | 33—113 X |
| 771,392 | 10/1904 | Rechenberg | 33—75 |
| 919,883 | 4/1909 | King | 33—112 |
| 2,568,575 | 9/1951 | Wickman. | |
| 2,704,890 | 3/1955 | Welsch. | |
| 2,797,486 | 7/1957 | Vaara | 33—88 |
| 2,535,791 | 12/1950 | Fluke. | |

FOREIGN PATENTS

| | | |
|---|---|---|
| 1,052,509 | 9/1953 | France. |
| 600,714 | 4/1948 | Great Britain. |
| 779,580 | 7/1957 | Great Britain. |

HARRY N. HAROIAN, Primary Examiner

U.S. Cl. X.R.

33—112